(12) United States Patent
Obaidi et al.

(10) Patent No.: US 11,133,983 B2
(45) Date of Patent: Sep. 28, 2021

(54) PROVISIONING EDGE DEVICES IN A MOBILE CARRIER NETWORK AS COMPUTE NODES IN A BLOCKCHAIN NETWORK

(71) Applicant: T-Mobile USA, Inc., Bellevue, WA (US)

(72) Inventors: Ahmad Arash Obaidi, San Ramon, CA (US); Shawn David Corey, Kenmore, WA (US); Andrew Lee Watts, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/220,628

(22) Filed: Dec. 14, 2018

(65) Prior Publication Data

US 2020/0195497 A1 Jun. 18, 2020

(51) Int. Cl.
*H04L 12/24* (2006.01)
*G06F 16/182* (2019.01)
*H04L 9/06* (2006.01)
*G06F 9/455* (2018.01)

(52) U.S. Cl.
CPC ...... *H04L 41/0806* (2013.01); *G06F 9/45558* (2013.01); *G06F 16/1824* (2019.01); *H04L 9/0643* (2013.01); *G06F 2009/4557* (2013.01); *G06F 2009/45595* (2013.01); *H04L 2209/38* (2013.01)

(58) Field of Classification Search
CPC . H04L 41/50; H04L 41/5009; H04L 41/0806; H04L 41/5051; H04L 9/06; H04L 9/32; H04L 9/0643; H04L 9/3239; H04L 12/24; H04L 29/06; H04L 2209/38; H04L 2209/80; H04L 63/12; G06F 16/27; G06F 16/1824; G06F 16/2365; G06F 16/182; G06F 16/901; G06F 16/9014; G06F 9/455; G06F 9/45558; G06F 2009/4557; G06F 2009/45562; G06F 2009/45575; G06F 2009/45595; H04W 12/00
USPC ........................................................ 709/220
See application file for complete search history.

(56) References Cited

U.S. PATENT DOCUMENTS 10,326,802 B1 * 6/2019 Irwan .................. H04L 65/608
2017/0235585 A1    8/2017 Gupta et al.
2017/0337534 A1 * 11/2017 Goeringer ............ G06Q 20/123
(Continued)

FOREIGN PATENT DOCUMENTS

WO     WO2018125989 A2    7/2018

OTHER PUBLICATIONS

PCT Search Report and Written Opinion dated Mar. 26, 2020 for PCT Application No. PCT/US2019/063939, 12 pages.
(Continued)

*Primary Examiner* — James N Fiorillo
(74) *Attorney, Agent, or Firm* — Lee & Hayes, P.C.

(57) ABSTRACT

Technologies for using edge devices in a cellular network as compute nodes to participate in a blockchain network are described. A cellular network may provision one or more edge devices in communication with the cellular network to instantiate a virtual machine on the edge device to act as a compute node. The cellular network may submit a bid to solve a blockchain hash function using the compute nodes and may instruct the edge to solve the blockchain hash function.

18 Claims, 4 Drawing Sheets

(56) References Cited

U.S. PATENT DOCUMENTS

| | | | |
|---|---|---|---|
| 2018/0109541 A1* | 4/2018 | Gleichauf | H04W 12/10 |
| 2018/0123779 A1* | 5/2018 | Zhang | H04L 9/0637 |
| 2018/0144156 A1* | 5/2018 | Marin | G06F 21/54 |
| 2018/0194502 A1 | 7/2018 | Li | |
| 2018/0316543 A1 | 11/2018 | Hwant | |
| 2019/0013948 A1* | 1/2019 | Mercuri | G06F 11/3072 |
| 2019/0036887 A1* | 1/2019 | Miller | G06Q 20/02 |
| 2019/0073666 A1* | 3/2019 | Ortiz | G06F 16/27 |
| 2019/0116024 A1* | 4/2019 | Wright | H04L 9/0643 |
| 2019/0140919 A1* | 5/2019 | Smith | H04L 41/5019 |
| 2019/0149337 A1* | 5/2019 | Savanah | H04L 9/3252 713/168 |
| 2019/0158470 A1* | 5/2019 | Wright | G06Q 20/065 |
| 2019/0163912 A1* | 5/2019 | Kumar | H04L 9/3247 |
| 2019/0166117 A1* | 5/2019 | Kumar | H04L 67/104 |
| 2019/0172026 A1* | 6/2019 | Vessenes | H04L 9/3247 |
| 2019/0281259 A1* | 9/2019 | Palazzolo | H04L 9/0643 |
| 2019/0303363 A1* | 10/2019 | Leung | G06F 16/2379 |
| 2019/0311392 A1* | 10/2019 | Swamidurai | G06Q 30/0227 |
| 2019/0318129 A1* | 10/2019 | David | H04L 9/3239 |
| 2019/0319861 A1* | 10/2019 | Pan | H04L 9/0637 |
| 2019/0391971 A1* | 12/2019 | Bernat | G06F 9/5033 |
| 2020/0013053 A1* | 1/2020 | Amin | H04L 63/10 |
| 2020/0036712 A1* | 1/2020 | Soundararajan | H04L 63/0823 |
| 2020/0057860 A1* | 2/2020 | Patil | H04L 63/1433 |
| 2020/0186607 A1* | 6/2020 | Murphy | H04W 4/24 |
| 2020/0234386 A1* | 7/2020 | Blackman | H04L 9/0894 |

OTHER PUBLICATIONS

Sedrati, et. al., "Blockchain and IoT: Mind the Gap", In: InterIoT 2017, SaSeIoT 2017: Interoperability, Safety and Security in IoT, pp. 113-122, Jul. 17, 2018, pp. 116-119.

* cited by examiner

PROVISIONING EDGE DEVICES IN A MOBILE CARRIER NETWORK AS COMPUTE NODES IN A BLOCKCHAIN NETWORK

BACKGROUND

Blockchain processes are increasing being used for various transactions in today's economy. Generally, a blockchain is an ever-increasing list of transactions (or records) called blocks. The blocks are joined together using cryptographic hashes, timestamps, and transaction data. One of the largest uses is to serve as a public transaction ledger for the cryptocurrency referred to as bitcoin.

However, there can be various limitations to implementing a blockchain strategy or increasing its use into various industries. For example, the data "miners" used to guess solutions, e.g. "proof of work," to hash functions that connect blocks can be costly and use significant energy resources. These sometimes large, centralized banks of (super)computers can place significant burdens on power grids.

There can be a significant number of these computer that are trying to solve the same hash function first to "win" money. Thus, for the one computer that provides a solution to a hash function first, there may be thousands or millions of other computers that do not solve it first and have essentially wasted electrical energy because they were not the first to provide a solution to the hash function.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Described herein are technologies for provisioning edge devices to operate in a blockchain network. It should be noted that although the following description is provided in terms of use of a blockchain network, the presently disclosed subject matter may be used for other applications in a distributed computing environment. In conventional technologies, compute nodes compete to provide a solution to a hash function that is used to join transactions to form blockchains. That means that despite thousands of computers expending energy, the energy expended by only one computer (the winner that first provides a solution to the hash function in blockchain) will be used to add to the blockchain. Further, the number of nodes to mine in the blockchain is typically a discrete number specifically designed and operated to mine blockchain hash functions. Thus, in conventional technologies, there is a significant expenditure and waste of energy resources by computers whose sole purpose is to mine for solutions to hash functions.

Figure 1:
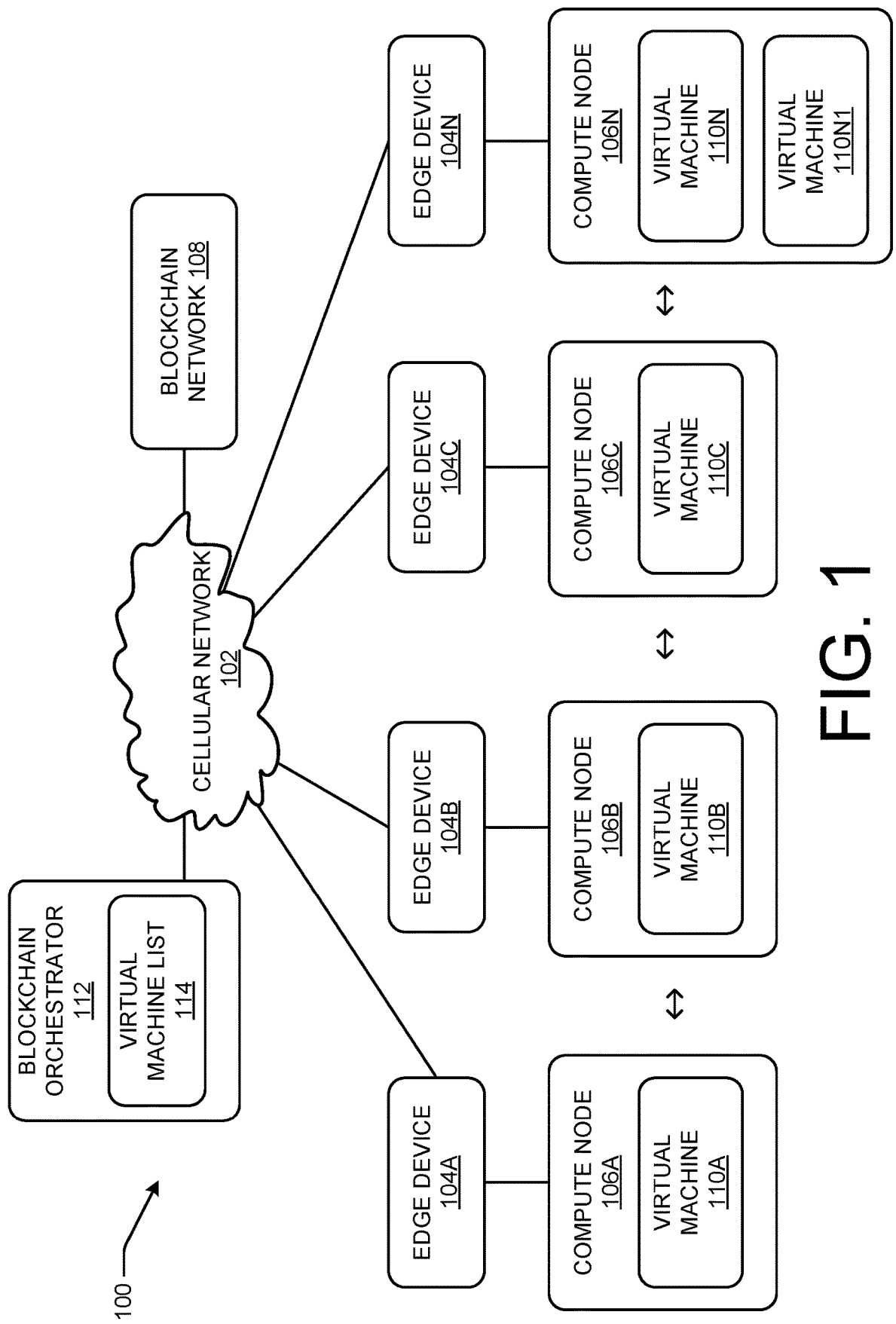
FIG. 1 illustrates an example operation environment for provisioning edge devices to operate in a blockchain network.

FIG. 1 illustrates an example operation environment 100 to provision edge devices in a cellular network 102 to operate in a blockchain network. The cellular network 102 may be various types of networks, including, but not limited to, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). In some examples, the cellular network 102 can include any cellular or non-cellular network topologies including, but not limited to, 2G, 3G, 4G, 4G LTE, 5G, Wi-Fi, Bluetooth, Bluetooth Low Energy, and the like. In other examples, the cellular network 102 can be wired or wireless Internet Protocol-based networks capable of establishing communication with a communication services server.

The cellular network 102 is in communication with edge devices 104A-104N (individually, "edge device 104A," "edge device 104B," and so forth, and collectively, "the edge devices 104"). The edge devices 104 control communication between compute nodes 106A-106N (individually, "compute node 106A," "compute node 106B," and so forth, and collectively, "the compute nodes 106"). The edge devices 104 control the communication between each of their respective compute nodes 106 and the cellular network 102. One or more of the edge devices 104 may include an edge router that is deployed to connect a campus network to the internet or a wide area network (WAN). One or more of the edge devices 104 may include a routing switch. One or more of the edge devices 104 may also include a firewall that filters data moving between internal and external networks. One or more of the edge devices 104 may also include Internet-of-Things (IoT) devices such as sensors, meters, appliances (such as coffee makers, refrigerators, and the like), actuators and other endpoints, as well as IoT gateways. The presently disclosed subject matter is not limited to any particular type of the edge devices 104.

The compute nodes 106 are nodes operating in conjunction with the edge devices 104A, 104B, 104C, . . . , 104N. The compute nodes 106 are compute nodes for a blockchain network 108 through the instantiation of a virtual machine 110 (individually, "virtual machine 110A," "virtual machine 110B," and so forth, and collectively, "the virtual machines 110") on the compute nodes 106. It should be noted that the edge devices 104 may be separate components from their respective compute nodes 106 or may be part of the compute nodes 106 themselves, or in various combinations. The virtual machine 110 may be various types of virtual machines that enable the compute node 106 to act as a node for the blockchain network 108. In some examples, one or more of the virtual machines are ETHERIUM virtual machine (EVM), though other types of virtual machines may be used and are considered to be within the scope of the presently disclosed subject matter. It should be noted that the blockchain network 108 may be part of the cellular network 102, acting as a private blockchain network, or part of another entity acting as a private or public blockchain network.

The blockchain network 108 can include the compute nodes 106 as well as other nodes not illustrated or in direct communication with the cellular network 102 that are communicatively connected to create a mesh. In some examples, each of the compute nodes 106 will download and update a copy of a particular blockchain. The blockchain network 108 is used to provide updates to the compute nodes 106 through the cellular network 102.

As mentioned above, the operation environment 100 may be used to establish a blockchain marketplace using a cellular network 102. In some examples, the edge devices 104, though providing other functionality such as sensor, IoT device, and the like, may also be tasked by the cellular network 102 to participate as a node in the blockchain network 108. The cellular network 102 may use a blockchain orchestrator 112 to provision (e.g., bring online) and control the compute nodes 106. The blockchain orchestrator 112 may provision the compute nodes 106 to act collectively or individually as nodes in the blockchain network 108.

The blockchain orchestrator 112 may provision one or more of the compute nodes 106 according to various rules or requirements. For example, one or more of the compute nodes 106 may be IoT devices that are configured to allow a user or operator to opt in to be one of the compute nodes 106. For example, the edge device 104A may be an IoT device such as a refrigerator that has a certain amount of processing power. The processing power of the edge device 104A may be usable as a compute node in the blockchain network 108. In some examples, the owner or operator of the edge device 104A may be provided with an option or incentive to add the edge device 104A as a compute node 106A in the blockchain network 108. In other instances, the edge device 104A may be configured to default as a compute node 106A. The owner or operator of the edge device 104A may be incentivized to make available the edge device 104A as the compute node 106A.

There are various manners in which to implement the operating environment 100 as a blockchain marketplace. For example, an entity (not shown) may submit a transaction to be entered as a block in a blockchain implemented by the blockchain network 108. In order for the transaction to be entered as a block in the blockchain and become part of the ledger of the blockchain, the blockchain network 108 will send out to nodes that are part of the blockchain network 108 a hash function so that the nodes can mine for a solution to a hash function to enter that transaction into the ledger of the blockchain.

In some examples of the presently disclosed subject matter, rather than the blockchain network 108 sending out a hash function to the blockchain "ether" for nodes to mine, the cellular network 102 can submit a price to the blockchain network 108 to solve the hash function. The cellular network 102 can submit as a contract a certain amount of processing power offered by the edge devices 104 that are instantiated as compute nodes 106. The cellular network 102 can essentially bid (e.g. offer a price as well as other potential terms) to mine, or acquire the rights to solve, hash functions for the blockchain network 108.

As part of the bid, or as information to inform the terms of the bid, the blockchain orchestrator 112 maintains a virtual machine list 114. The virtual machine list 114 is a list of edge devices 104 that are instantiated as compute nodes 106. The virtual machine list 114 may also maintain additional information about the compute nodes 106, such as the available processing power of the compute node 106 (e.g. 1 Mhz processor with 10 MB of memory versus 5 Ghz with 1 TB of memory), connection capabilities (e.g. fiberoptic data speeds versus dial-up data speeds, and the like). The virtual machine list 114 can also include information about "whitelisted" or "blacklisted" compute nodes 106. For example, verified compute nodes 106 can be whitelisted, and thus, available to be used. Non-verifiable compute nodes 106, such as a compute node 106 that is suspected to be stolen or tampered with, can be blacklisted, and thus, even though signed up as one of the compute nodes 106, can be listed as unavailable. Thus, with various information, the cellular network 102 may have an indication of the processing capability that can be offered for any particular contract. If accepted for a contract by the blockchain network 108, the blockchain orchestrator 112 provisions one or more of the compute nodes 106 to provide the services required to mine and updates the information in the virtual machine list 114.

In some examples, the owner or operator of the edge device 104 may receive incentives to allow the edge device 104 to operate as a compute node 106. For example, a portion of the money earned by completing the mining operation may be transferred to the owner or operator of the edge device 104, thus incentivizing the owners or operators to instantiate their edge devices 104 as compute nodes 106. Further, because in some examples the provisioning is done by the blockchain orchestrator 112, the owner or operator of the edge devices 104 may earn money or other incentives with little to no effort on their part, other than to opt-in.

The provisioning of the compute nodes 106 by the blockchain orchestrator 112 may be done for various reasons. For example, the edge devices 104 may be located in different regions. The blockchain orchestrator 112 may provision the edge devices 104 to have the edge devices 104 compute after the mid-afternoon hours, or the cooler part of the day. In some examples, the blockchain orchestrator 112 may receive temperature data (not shown) for the environments in which the edge devices 104 are located. The blockchain orchestrator 112 may provision edge devices 104 as compute nodes 106 if the edge devices 104 are in climates at or below a certain temperature Because processing may increase energy usage, and therefore heat, the blockchain orchestrator 112 may first provision devices that are at cooler temperatures to reduce the amount of strain on cooling systems that are used to cool the edge devices 104 performing compute operations. The blockchain orchestrator 112 can query edge device 104 for temperature and/or compute information to select edge device 104 for provision based on a variety of factors.

Further, the blockchain orchestrator 112 may perform a "rolling" provision. For example, a contract accepted by the blockchain network 108 may require two compute nodes. The blockchain orchestrator 112 may determine that initially edge devices 104A and 104B should be provisioned because the edge devices 104A and 104B are associated with an IoT device that is likely not being used (e.g. a coffee machine or refrigerator) because it is 2 am in the morning. The blockchain orchestrator 112 may initially provision edge devices 104A and 104B; however, as the local time of the edge devices 104A and 104B approach 5 am, the probability of the need for the edge devices 104A and 104B to be used for their primary purpose may increase. The blockchain orchestrator 112 may determine that the local time of the edge device 104C is approaching a time that the probability of use of the edge device 104C is low. The blockchain orchestrator 112, in that example, may move the compute operations from the edge devices 104A and 104B to the edge device 104C.

In some examples, the compute nodes 106 may include more than one instance or example of a virtual machine. For example, the compute node 106N includes the virtual machine 110N as well as a virtual machine 110N1. For example, the virtual machine 110 may be an ETHERIUM virtual machine, whereas the virtual machine 110N1 may be the same or another type of virtual machine, such as an IOTA virtual machine provided by the IOTA Foundation. Other virtual machines may be instantiated on the compute node 106N and are considered to be within the scope of the presently disclosed subject matter.

Further, the cellular network 102 may use the blockchain orchestrator 112 to allow one or more of the edge devices 104 to provide data to the blockchain network 108. One or more of the edge devices 104 may be sensors that collect and send data to their respective services. For example, the edge device 104B may be a power meter that uses the cellular network 102 to transmit its power usage data to a power company (not shown). Although the power company may use the data for billing purposes, the power company may want to be able to sell aggregated data to services that use that aggregated data to provide products, services, or analysis, and in some instances, are willing to pay for that aggregated data. In this example, the blockchain orchestrator 112 may provision the edge device 104B as a data provider for the blockchain network 108. The blockchain network 108 may be in communication from services that want to use power data but secured in the manner the blockchain provides. The edge device 104B may transmit data to both the power company (in this example) as well as a data aggregation or collection service, as may be provided by an entity including, but not limited to, the cellular network 102. To enter the data as a block in the blockchain, as described above, the cellular network 102 can bid on being the entity to mine for a solution to the hash function. The owner or operator of the edge device 104B can receive revenue by providing data and, if provisioned as the compute node 106B, can receive revenue by mining a solution for the blockchain network 108 if the cellular network wins a bid to provide a solution. Using edge devices 104 that are in communication with the cellular network 102, the data provided by those devices can be more secure than collecting data from sensors that may not be part of the cellular network 102. For example, when initially installing the edge device 104B, the ownership and other identification information may be entered by the cellular network 102 into the virtual machine list 114, and thereafter, entered as information for the blockchain ledger.

Figure 2:
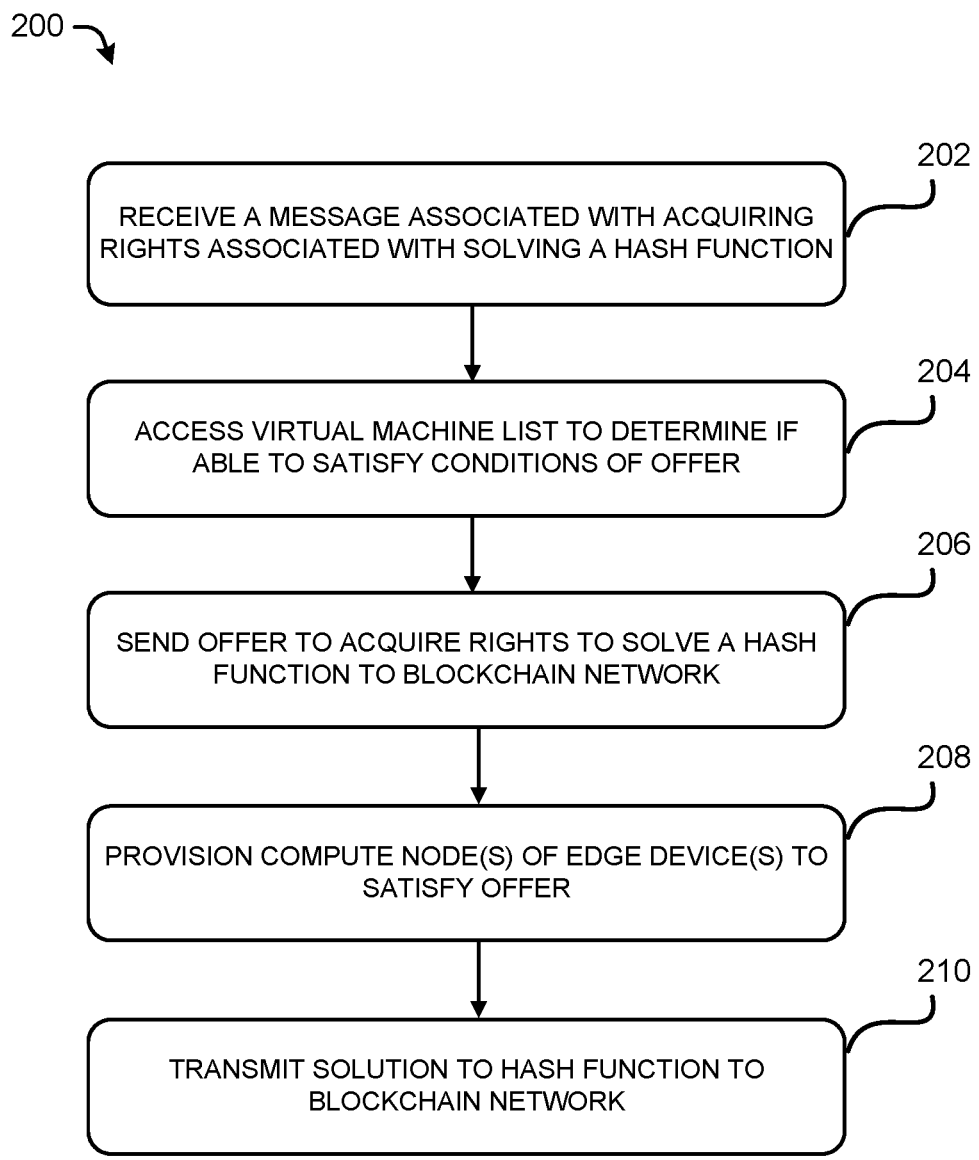
FIG. 2 is an illustrative process for bidding for contracts in a blockchain network using a cellular network.

FIG. 2 is an illustrative process 200 for offering to solve a hash function in a blockchain network using a cellular network. The process is illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 2, the process 200 for offering to solve a hash function in a blockchain network using a cellular network commences at operation 202, wherein an offer to solve a hash function (i.e. to mine for a solution) is received at the cellular network 102 from the blockchain network 108. The cellular network 102 is in communication with one or more edge devices 104 that may have opted in or are selected to be compute nodes 106 capable of individually or collectively mining for solutions to a hash function. The available edge devices 104 available as compute nodes 106 are stored by the blockchain orchestrator 112 in the virtual machine list 114. In some examples, the offer can be a "request for quote" type of bid whereby the cellular network 102 submits a quote to perform the services requested of the blockchain network 108. Other types of bidding mechanisms may be used including, but not limited to, blind auctions, reverse auctions, and the like. The presently disclosed subject matter is not limited to any particular type of bidding or auction system.

The process 200 continues to operation 204, where the cellular network 102 accesses the virtual machine list 114 to determine if the cellular network 102 is able to satisfy the terms of the offer. The cellular network 102 accesses the virtual machine list 114 to determine if the individual or collective processing capability of the compute nodes 106 available for mining is sufficient to meet the timing or pricing requirements of the received offer.

The process 200 continues to operation 206, where the cellular network 102 sends an offer to the blockchain network 108. In some examples, the offer from the cellular network 102 may be just an acceptance of the terms of the offer. In other examples, the bid may be a quote for services. These and other examples are considered to be within the scope of the presently disclosed subject matter.

The process 200 continues to operation 208, where, if the offer transmitted by the cellular network 102 is approved, the cellular network 102 instructs the blockchain orchestrator 112 to provision one or more of the edge devices 104 as compute nodes 106 to satisfy the terms of the offer (or bid).

The process 200 continues to operation 210, where the solution to the hash function is transmitted to the blockchain network. In some examples, the blockchain network 108 may cause the transmission of an acknowledgement of the submission of a correct solution. The acknowledgment may take various forms, including, but not limited to, a payment of money. The process 200 thereafter ends.

Figure 3:
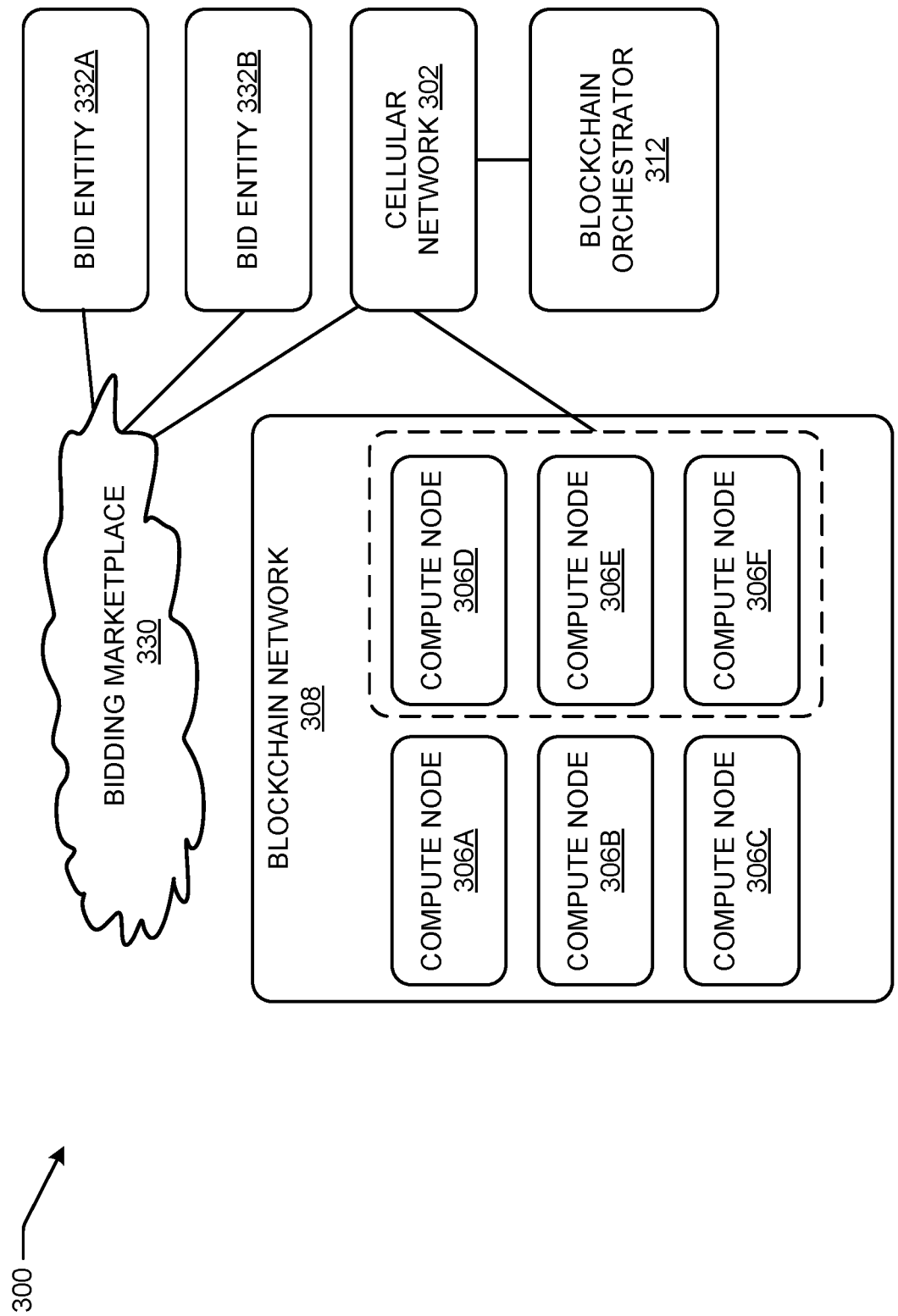
FIG. 3 illustrates an example operation environment in which a cellular network may participate in a bidding marketplace.

FIG. 3 illustrates an example operation environment 300 in which a cellular network 302 may participate both in a bidding marketplace 330 as well as provisioning compute nodes to be part of a blockchain network 308. In FIG. 3, the cellular network 302, bid entity 332A, and bid entity 332B are participating as bidders in the bidding marketplace 330, a clearinghouse for blockchain mining operations to be bid on by entities such as the cellular network 302, the bid entity 332A, and the bid entity 332B.

Also illustrated is the blockchain network 308, a collection of compute nodes 306A-306F that can be accessed or controlled by one or more entities, such as the cellular network 302, the bid entity 332A, and the bid entity 332B. In FIG. 3, the cellular network 302 has instructed a blockchain orchestrator 312 to provision the compute nodes 306D-306F, which may be edge devices part of the cellular network 302 (such as those illustrated in FIG. 1), to act as nodes in the blockchain network 308. In the manner illustrated in FIG. 3, the cellular network 302 may both participate as bidders in the bidding marketplace 330 as well as provide the compute nodes 306D-306F.

The cellular network 302 can add (provision) or remove (deprovision) the compute nodes 306D-306F from the blockchain marketplace 308 as needed or as desired. For example, the compute nodes 306D and 306E may be part of a first set of compute nodes provisioned to satisfy a bid. The cellular network 302 may determine that the compute node 306D is to be deprovisioned and removed as a compute node. The cellular network 302 may provision the compute node 306F, which may be part of a second set of compute nodes and have the compute node 306F act as a compute node in the first set of compute nodes. The cellular network 302 may thereafter deprovision the compute node 306D (or the deprovisioning may occur before or during the provisioning of the compute node 306F).

Figure 4:
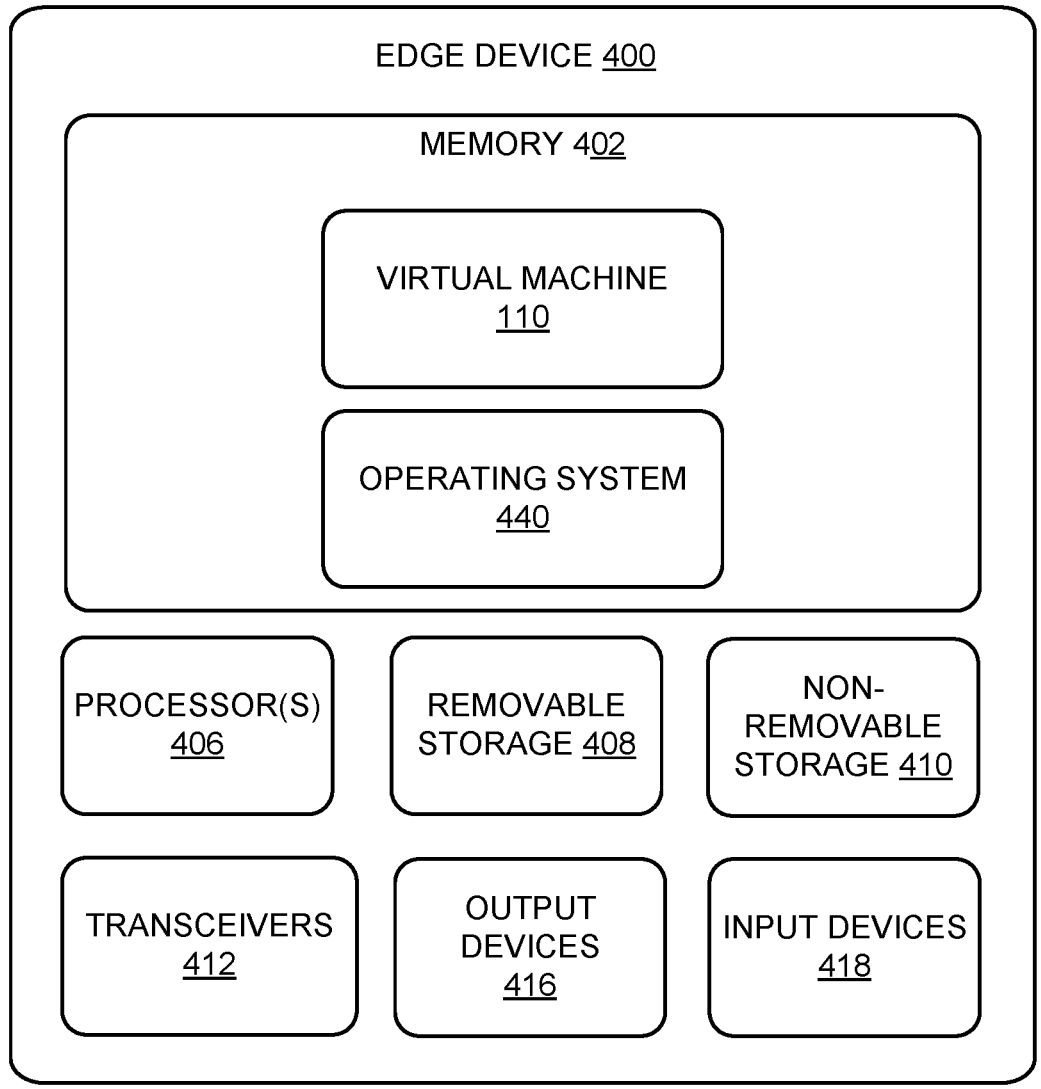
FIG. 4 illustrates a component level view of an edge device configured for use within a wireless communication network in order to provide various services within a wireless communication network.

FIG. 4 illustrates a component level view of an edge device 400 configured to act as a compute node. As illustrated, the edge device 400 comprises a system memory 402 storing computer-executable instructions to implement a virtual machine 110. The system also is storing computer-executable instructions to implement the operating system 440. The operating system 440 is executed by processor(s) 406 and controls operational aspects of the edge device 400, such as the virtual machine 110.

The edge device 400 includes the processor(s) 406, a removable storage 408, a non-removable storage 410, transceivers 412, output device(s) 416, and input device(s) 418. In various implementations, the system memory 402 is volatile (such as RAM), non-volatile (such as ROM, flash memory, etc.) or some combination of the two. In some implementations, the processor(s) 406 is a central processing unit (CPU), a graphics processing unit (GPU), or both CPU and GPU, or any other sort of processing unit.

The edge device 400 may also include additional data storage devices (removable and/or non-removable) such as, for example, magnetic disks, optical disks, or tape. Such additional storage is illustrated in FIG. 4 by removable storage 408 and non-removable storage 410.

Non-transitory computer-readable media may include volatile and nonvolatile, removable and non-removable tangible, physical media implemented in technology for storage of information, such as computer readable instructions, data structures, program modules, or other data. System memory 402, removable storage 408 and non-removable storage 410 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the edge device 400. Any such non-transitory computer-readable media may be part of the edge device 400.

In some implementations, the transceivers 412 include any sort of transceivers known in the art. For example, the transceivers 412 may include wired communication components, such as an Ethernet port, for communicating with other networked devices. Also, or instead, the transceivers 412 may include wireless modem(s) that may facilitate wireless connectivity with other computing devices. Further, the transceivers 412 may include a radio transceiver that performs the function of transmitting and receiving radio frequency communications via an antenna.

In some implementations, the output devices 416 include any sort of output devices known in the art, such as a display (e.g., a liquid crystal display), speakers, a vibrating mechanism, or a tactile feedback mechanism. Output devices 416 also include ports for one or more peripheral devices, such as headphones, peripheral speakers, or a peripheral display.

In various implementations, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, at a cellular network from a blockchain network, a first message associated with acquiring rights associated with solving a hash function;
   determining, by the cellular network, that at least one of a plurality of edge devices in communication with the cellular network are capable of provisioning as compute nodes;
   transmitting, by the cellular network to the blockchain network, a second message responsive to the first message and based at least in part on the determining that the at least one of the plurality of edge devices in communication with the cellular network are capable of provisioning as compute nodes;
   receiving, from the blockchain network, a response to the second message providing the rights associated with solving the hash function, wherein the first message, the second message and the response comprise an offer and an acceptance of the offer between the blockchain network and the cellular network, the offer and the acceptance of the offer being associated with acquiring the rights associated with solving the hash function for the blockchain network at least in part In return for compensation to the cellular network from the blockchain network;
   provisioning, by a blockchain orchestrator of the cellular network, based at least in part on the response, a first set of the plurality of the edge devices to act as compute nodes, to solve the hash function;
   receiving, by the cellular network, a solution to the hash function from at least one of the first set of the plurality of the edge devices; and
   transmitting, by the cellular network, the solution to the blockchain network.

2. The method of claim 1, wherein at least one of the edge devices is an Internet-of-Things (IoT) device.

3. The method of claim 2, wherein the IoT device comprises a sensor, actuator, meter, or appliance.

4. The method of claim 1, wherein at least one of the edge devices comprises a routing switch or a firewall.

5. The method of claim 1, wherein provisioning the first set of the plurality of the edge devices to act as compute nodes comprises instantiating a virtual machine on at least one edge device to be provisioned.

6. The method of claim 1, further comprising: receiving an acknowledgement from the blockchain network; and transmitting the acknowledgement received from the blockchain network to an owner of at least one of the first set of the plurality of edge devices provisioned to act as compute nodes.

7. The method of claim 1, further comprising:
    determining that one of the first set of the plurality of the edge devices is to be deprovisioned;
    provisioning an edge device in a second set of edge devices as a compute node to satisfy the rights associated with solving the hash functions;
    deprovisioning the one of the first set of the plurality of edge devices; and operating the edge device in the second set of edge devices as part of the first set of the plurality of edge devices.

8. A non-transitory computer-readable storage medium having computer-executable instructions stored thereupon that, when executed by a computer, cause the computer to:
    receive, at a cellular network from a blockchain network, a first message associated with acquiring rights associated with solving a hash function;
    determine, by the cellular network, that at least one of a plurality of edge devices in communication with the cellular network are capable of provisioning as compute nodes;
    transmit, by the cellular network to the blockchain network, a second message responsive to the first message and based at least in part on the determining that the at least one of the plurality of edge devices in communication with the cellular network are capable of provisioning as compute nodes;
    receive, from the blockchain network, a response to the second message providing the rights associated with solving the hash function, wherein the first message, the second message and the response comprise an offer and an acceptance of the offer between the blockchain network and the cellular network, the offer and the acceptance of the offer being associated with acquiring the rights associated with solving the hash function for the blockchain network at least In part In return for compensation to the cellular network from the blockchain network;
    provision, by a blockchain orchestrator of the cellular network, based at least in part on the response, a first set of the plurality of the edge devices to act as compute nodes, to solve the hash function;
    receive, by the cellular network, a solution to the hash function from at least one of the first set of the plurality of the edge devices; and
    transmit, by the cellular network, the solution to the blockchain network.

9. The non-transitory computer-readable storage medium of claim 8, wherein at least one of the edge devices is an Internet-of-Things (IoT) device.

10. The non-transitory computer-readable storage medium of claim 9, wherein the IoT device comprises a sensor, actuator, meter, or appliance.

11. The non-transitory computer-readable storage medium of claim 8, wherein at least one of the edge devices comprises a routing switch or a firewall.

12. The non-transitory computer-readable storage medium of claim 8, wherein the computer-executable instructions to provision the first set of the plurality of the edge devices to act as compute nodes further comprises computer-executable instructions that, when executed by the computer, cause the computer to instantiate a virtual machine on at least one edge device to be provisioned.

13. The non-transitory computer-readable storage medium of claim 12, wherein the virtual machine comprises an ETHERIUM virtual machine or an IOTA virtual machine.

14. The non-transitory computer-readable storage medium of claim 8, further comprising computer-executable instructions that, when executed by the computer, cause the computer to:
    receive an acknowledgement from the blockchain network; and transmit the acknowledgement received from the blockchain network to an owner of at least one of the first set of the plurality of edge devices provisioned to act as compute nodes.

15. The non-transitory computer-readable storage medium of claim 8, further comprising computer-executable instructions that, when executed by the computer, cause the computer to:
    determine that one of the first set of the plurality of the edge devices is to be deprovisioned;
    provision an edge device in a second set of edge devices as a compute node to satisfy a bid;
    deprovision the one of the first set of the plurality of edge devices; and operate the edge device in the second set of edge devices as part of the first set of the plurality of edge devices.

16. A system comprising:
    a cellular network in communication with a blockchain network to:
    receive, from the blockchain network, a first message associated with acquiring rights associated with solving a hash function;
    transmit, to the blockchain network, a second message responsive to the first message and based at least in part on determining that at least one of a plurality of edge devices in communication with the cellular network are capable of provisioning as compute nodes;
    receive, from the blockchain network, a response to the second message providing the rights associated with solving the hash function, wherein the first message, the second message and the response comprise an offer and an acceptance of the offer between the blockchain network and the cellular network, the offer and the acceptance of the offer being associated with acquiring the rights associated with solving the hash function for the blockchain network at least In part in return for compensation to the cellular network from the blockchain network;
    a plurality of edge devices in communication with the cellular network, the plurality of edge devices comprising sensors, actuators, meters, appliances, routing switches, or firewalls; and
    a blockchain orchestrator in communication the cellular network, the blockchain orchestrator configured to provision, based at least in part on the response, a first set of the plurality of edge devices to solve the hash function, wherein the blockchain orchestrator maintains a virtual machine list comprising a list of one or more of the plurality of edge devices instantiated as a compute node operating a virtual machine to perform mining for the blockchain network;
    receive, by the cellular network, a solution to the hash function from at least one of the first set of the plurality of the edge devices; and
    transmitting, by the cellular network, the solution to the blockchain network.

17. The system of claim 16, wherein the virtual machine comprises an ETHERIUM virtual machine or an IOTA virtual machine.

18. The system of claim 16, wherein the cellular network receives an acknowledgement from the blockchain network for a successful mining operation and transmits the acknowledgement received from the blockchain network to an owner of at least one of the plurality of edge devices.

\* \* \* \* \*